Nov. 14, 1967  G. R. EKERS  3,352,981
CARD READER
Filed July 22, 1963  7 Sheets-Sheet 1
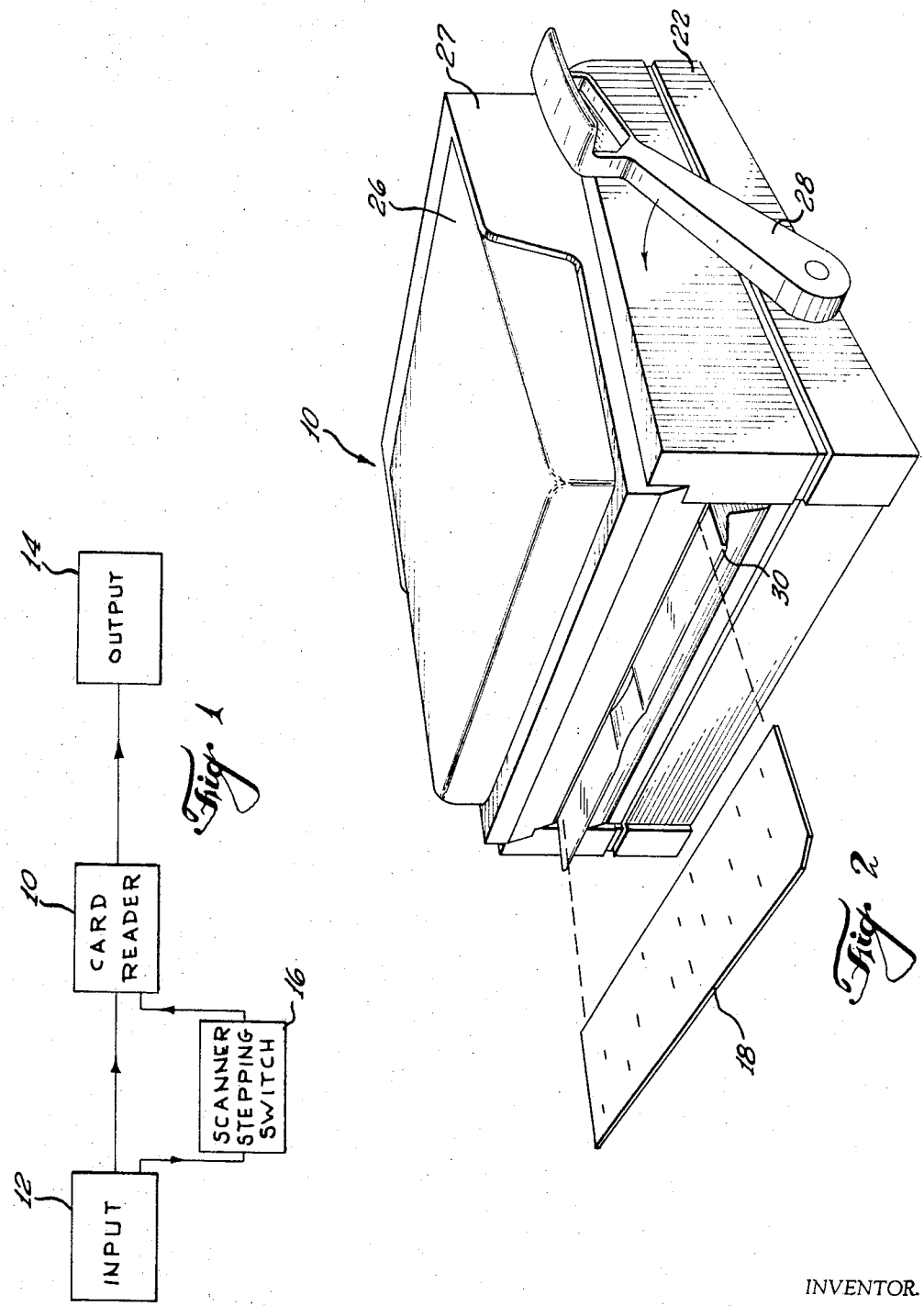
INVENTOR.
GLENN R. EKERS
BY
Curtis, Morris & Safford Nov. 14, 1967          G. R. EKERS              3,352,981
                        CARD READER
Filed July 22, 1963                        7 Sheets-Sheet 2
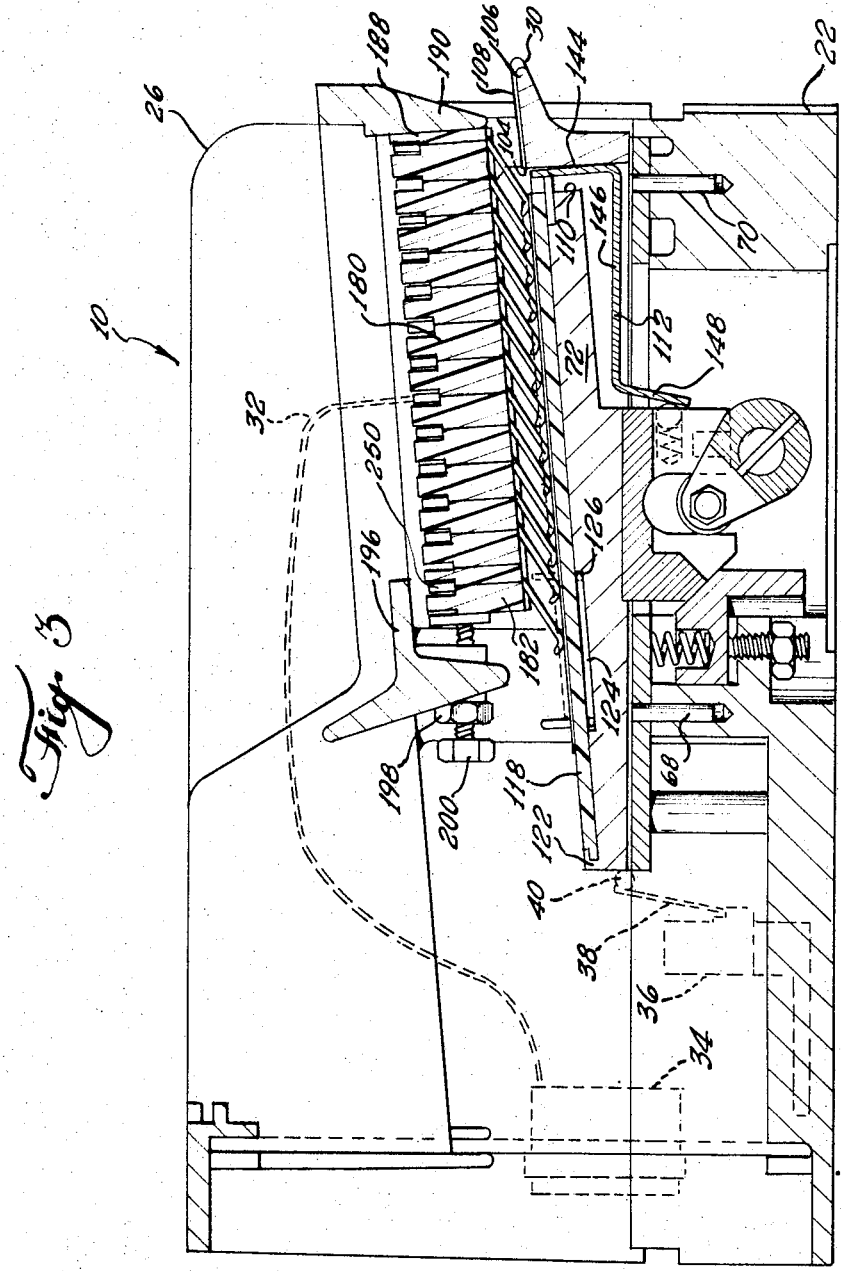
INVENTOR.
GLENN R. EKERS
BY
Curtis, Morris + Safford Nov. 14, 1967  G. R. EKERS  3,352,981
CARD READER
Filed July 22, 1963  7 Sheets-Sheet 3

INVENTOR.
GLENN R. EKERS
BY

Nov. 14, 1967  G. R. EKERS  3,352,981
CARD READER

Filed July 22, 1963  7 Sheets-Sheet 4

INVENTOR.
GLENN R. EKERS
BY

INVENTOR.
GLENN R. EKERS

Nov. 14, 1967  G. R. EKERS  3,352,981
CARD READER
Filed July 22, 1963  7 Sheets-Sheet 6
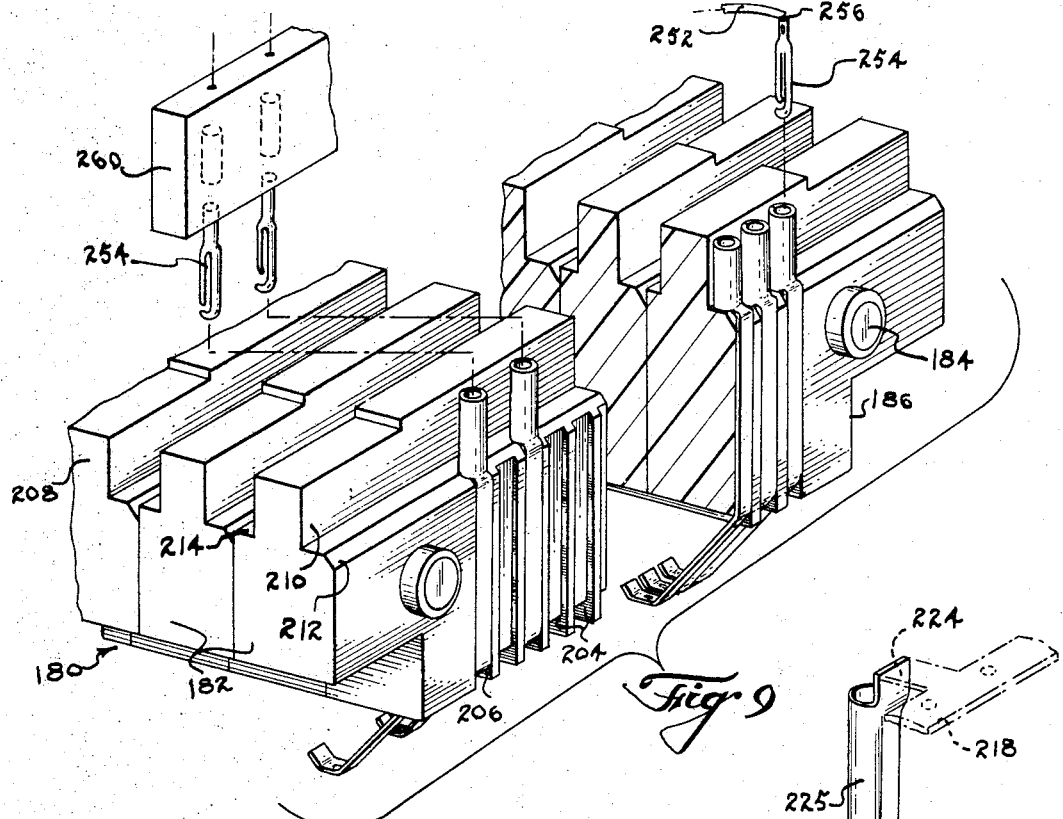
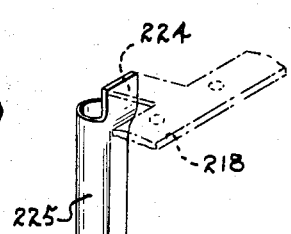
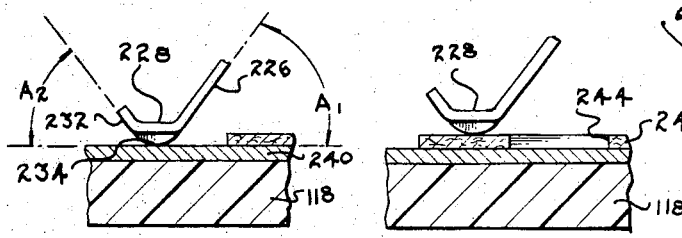
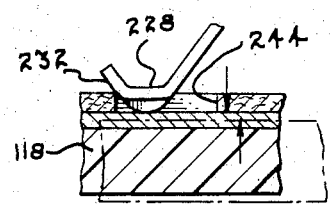
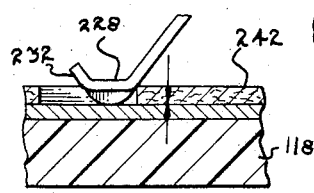
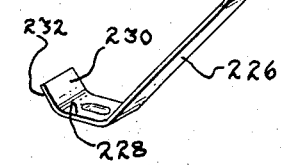
INVENTOR.
GLENN R. EKERS
BY
*Curtis, Morris & Safford*

United States Patent Office 3,352,981
Patented Nov. 14, 1967

3,352,981
CARD READER
Glenn R. Ekers, Camp Hill, Pa., assignor to AMP
Incorporated, Harrisburg, Pa.
Filed July 22, 1963, Ser. No. 296,812
15 Claims. (Cl. 200—46)

ABSTRACT OF THE DISCLOSURE

A card reader is disclosed which includes an array of contact spring members, one for each possible hole in a tabulating card, secured in an array within a housing in a position to be engaged by a card carried on the top of a drawer slidable from an open position partially out of such housing to an inward position within such housing. The top of the card drawer carries printed circuit paths which are caused to be engaged by contact springs fixed within the housing at the site of each card hole with such engagement being under an increasing wedging pressure with a substantial wiping of contact surface being provided by an oblique movement of the upper surface of the drawer.

---

This invention relates to an improved card reader of the type utilized to receive standard tabulating cards, develop therefrom electrical signals representative of the intelligence carried thereon and eject such cards responsive to manual actuation.

It is one object of this invention to provide a manual card reader of improved construction which is more reliable and has a longer mechanical life than card reader devices heretofore available.

It is a further object of the invention to provide a card reader having an improved card handling mechanism which is less damaging to the cards utilized therewith than devices heretofore available.

It is another object of the invention to provide a card reader having a novel contact spring and conductive path assembly which is readily replaceable to accommodate wear and to facilitate circuit pattern changes.

It is yet another object of the invention to provide a card reader having a novel contact spring construction in conjunction with an improved circuit to permit circuit pattern changes in a rapid and efficient manner.

It is yet another object of the invention to provide an improved card reader of heavy duty construction incorporating features to reduce the likelihood of improper card insertion or withdrawal.

It is yet another object of the invention to provide a universal card reader construction amenable to rapid conversion to the different card reading patterns required by different applications.

Background of the invention

In many prior art card reader devices contact closure is effected by a straight line movement of contact members together with the card to be read interposed therebetween. With certain of these embodiments the contact springs are disposed parallel to closure movement and must therefore accommodate a substantial deflection along the axis of movement. This requirement means that each contact engaging member must move and in turn must be interconnected to input and output leads associated with the reader through some separate fixed member. This increases the likelihood of high resistance paths since there is an additional sliding contact interface. It also substantially eliminates the provision of any substantial wiping action between the contact surfaces necessary to effect a reading of the card. Other embodiments of known readers which call for a straight line contact closure and provide contact spring members disposed at an angle to such closure do provide some wiping action between contact surfaces but there is a tendency to buckle or overly deflect the contact spring members. In both of the embodiments above mentioned the straight line closure action between contact surfaces tends to produce a higher engagement force between contact spring members and cards and therefore results in greater card wear and possible damage to contact spring members. In many of the known card reader assemblies the card is manually inserted within a slot and the final closure of contacts is made fairly well dependent upon the care or skill of the user in properly positioning the card.

Summary of the invention

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention, but are given for purposes of illustration in order that others skilled in the art may fully understand the invention and the principles thereof and the manner of applying it in practical use so that they may modify it in various forms, each as may be best suited to the conditions of a particular use.

The foregoing objects are achieved in the present invention through the provision of a card reader construction having a relatively heavy, but compact lower assembly carrying a card drawer actuating mechanism with an upper section including electrical spring members and conductive paths disposed beneath a detachable cover for easy access. The card drawer of the invention includes a novel but simple card ejecting mechanism operable to speed card handling without card damage. The card drawer of the invention is supported for sliding movement defining a particular oblique movement of a card to be read, which reduces card wear and provides, in conjunction with contact spring members, an improved wiping action of the contact surfaces of the drawer. Means are provided to cooperate with card and drawer movement to assure the improper insertion of a card within the drawer and proper closure of the drawer before the card can be read. The contact spring members of the upper section are mounted in a novel manner to provide consistency of spring orientation in the face of continued and heavy use. The conductive path mounting member secured within the card drawer is made readily removable such that alternative conductive path members may be inserted to change the electrical operation of the reader.

In the drawings:

FIGURE 1 is a schematic block diagram showing a typical circuit for card readers;

FIGURE 2 is a perspective of the card reader of the invention showing its general configuration, housing and arrangement of exterior parts relative to a card to be inserted therein;

FIGURE 3 is a section of the assembly shown in FIGURE 2 included to show the general arrangement of drawer operating mechanism, drawer and contact spring assembly with the dawer fully closed;

FIGURE 9 is a perspective showing the contact spring mounting arrangement;

FIGURE 10 is an enlarged perspective of the novel contact spring construction of the invention;

FIGURES 11–14 are action views of the ends of the contact spring of the invention in conjunction with its operation to effect an electrical connection through the hole of a tabulating card with the card drawer board conductive path.

Figure 4:
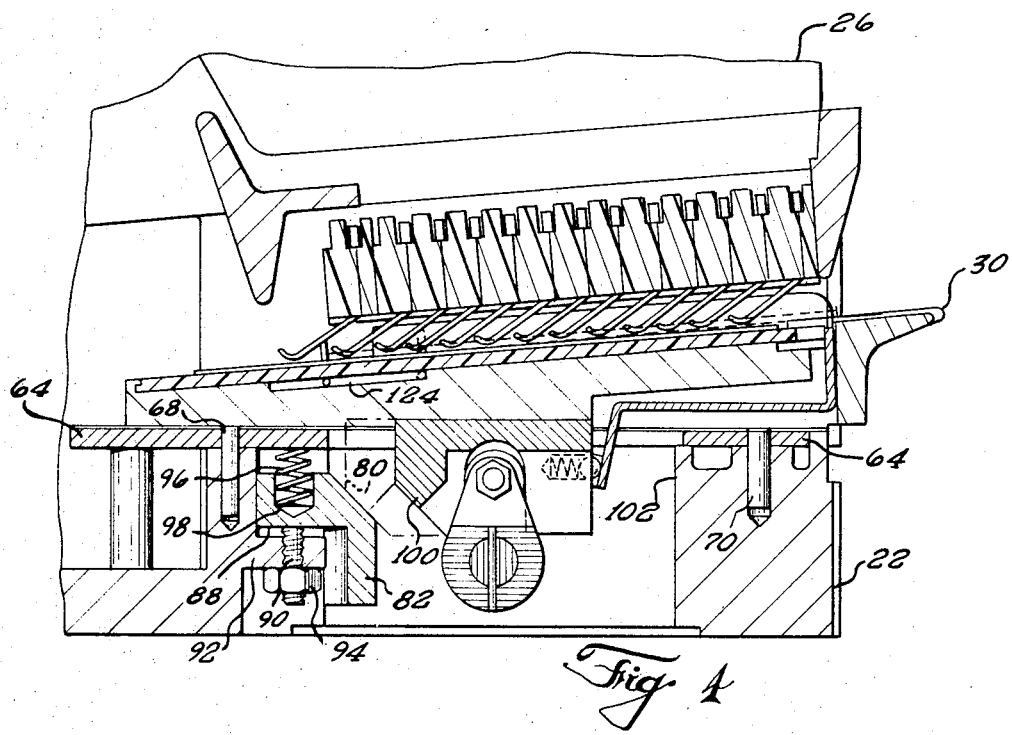
FIGURES 4 and 5 are partial sections of the assembly shown in FIGURE 3 depicting respective, drawer operating mechanism operation with the card reading drawer partially closed and fully opened.

*Description of preferred embodiment of the invention*

Turning now to FIGURE 1, the block labeled 10 represents a card reader capable of producing a defined pattern of closed electrical circuits representative of the intelligence content of a tabulating card inserted therein. The card reader 10 "reads" the tabulating card only physically; namely it operates to merely effect certain defined closures of conductive paths. To translate the physical reading accomplished by 10, a voltage source or input 12 is provided linking the conductive paths of 10 in a manner whereby the paths that are closed will produce an output on associated leads to a device 14 capable of utilizing the signals there developed. Typically, input device 12 is a standard low voltage source such as 6 to 12 volts and device 14 is a battery of switches, electro-mechanical or solid-state, adapted to respond to the presence of voltages to provide a visual, electrical, or mechanical indication of the card intelligence. With the units 10, 12 and 14 a considerable number of card reading applications can be handled, including controlled equipment switching, programming, intelligence tabulating and the like.

In certain applications, in order to reduce the complexity and size of the output device 14, a means for accomplishing read-out of only a portion of the intelligence content of a tabulating card at a time may be utilized. This is indicated as a scanner 16, which is a mechanical or solid-state stepping switch arranged to energize 10 with a series of inputs spaced in time and arranged to supply different portions of the card reader circuit to produce distinct outputs to 14 in sequence. For example, through the use of 16, spaced outputs representative of words may be provided to 14 with each column of the card representing a twelve bit word.

The card reader of the invention shown as 10 in FIGURE 2, is a manual type as distinguished from an automatic type. It is adapted for use by the small or medium sized consumer in installations wherein the particular application does not warrant the more expensive high-speed equipment of computer units. In such uses the unit is frequently operated by non-skilled office workers in typical office surroundings. Because of this the unit must be simple to operate, generally rugged, compact and reliable. The general arrangement of unit 10 to accomplish these features includes a relatively heavy base 22 housing a lower section therewithin, an upper section 24 and a detachable cover 26. On one side of unit 10 is provided an operating arm 28, which is adapted to be puled upwardly or depressed to operate a card drawer 30, respectively, into an open or closed position to accomplish reading of card such as 18 inserted within the drawer. This arrangement of parts permits unit 10 to be placed in a convenient location upon a desk or table with the only skill required by the operator being that of inserting the card 18 within drawer 30, which is normally open and depressing the arm 28 to accomplish card reading. As will be hereinafter indicated, a number of features are incorporated into unit 10 to preclude either an erroneous insertion of a card or improper manipulation of arm 28. As will also be hereinafter explained, the upper section and cover 26 are arranged to provide accessibility to the parts of the unit 10 most likely to be changed to accommodate different operations or to replace worn or damaged parts. The use of a drawer normally opened, but which must be closed to operate the device, has been found to be preferable to the usual provision of a slot or other such card entry point, which does not inherently prevent a card reading operation from occurring before all requirements as to card psitioning have been satisfied. With the unit 10, a card cannot be inserted unless the drawer 30 is in the fully opened position. If the drawer is open, then the unit is prepared to properly determine the correct or incorrect insertion of a card before any card reading step will take place. If the drawer is closed and must be opened, a card position sensing mechanism of the unit 10 will, of necessity, be conditioned for operation. As a further feature to be hereinafter shown, after card reading has taken place and handle 28 is rotated upwardly to open drawer 30, the card is partially ejected therefrom automatically to a position wherein it may be readily grasped for removal.

Figure 5:
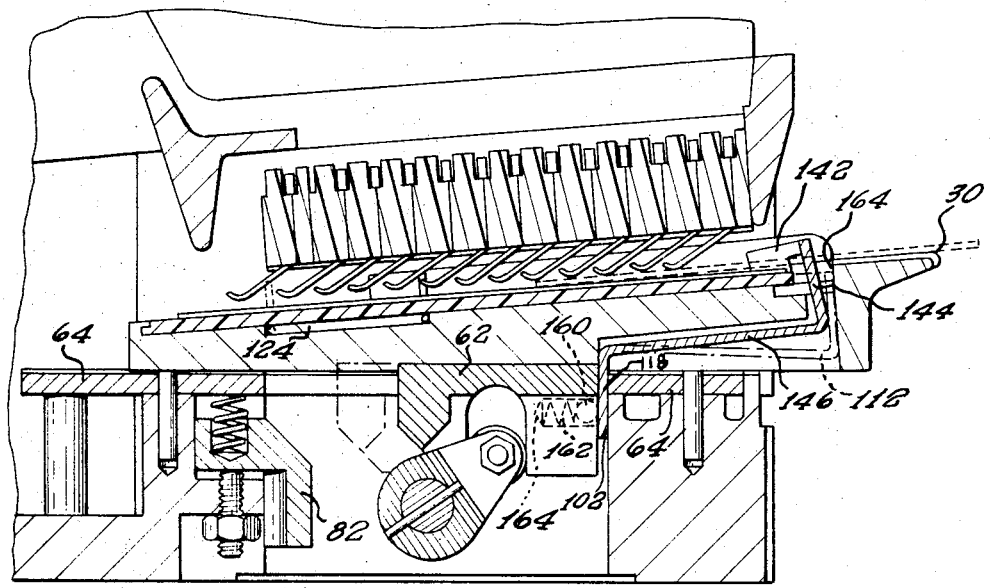

The above features may be better visualized from FIGURES 3–5. FIGURE 3 depicts the unit 10 with the drawer closed and a tabulating card shown in phantom inserted therein under rows of spring members; the end members only being shown. As can be seen therefrom, certain of the springs proximate the slots or holes in the card defining the intelligence content thereof would be down to engage conductive circuit paths beneath the card; the remaining springs riding on the top of the card. FIGURE 4 depicts the unit 10 with the drawer partially opened to show the card motion relative to the contact springs as the drawer is opened and additionally, the reverse case as the drawer is closed. FIGURE 5 depicts a sectional view of unit 10 with the drawer thereof fully opened and the card ejected for withdrawal from the unit. Referencing again FIGURE 3, there is shown in phantom, a conductive lead 32 which is representative of the conductive leads connecting all of the contact springs with input and output units 12 and 14. Lead 32 is connected to a block 34 fitted in the rear of the unit 10 which serves in common all of the conductive leads of the unit. Block 34 is preferably of a type mounting in close proximity a considerable number of male contact spring members which receive female contact members mounted in a block not shown, adapted to engage block 34 to interconnect the conductive leads of unit 10 with a bundle of leads connecting the unit to associated units 12 and 14. Further depicted in FIGURE 3 is a switch 36 including an arm 38 having a roller thereon, 40, adapted to engage and be driven by the rear face of drawer 30 when fully closed; the switch being electrically open in all other positions of the drawer 30. Switch 36 is in the input circuit to assure proper drawer closure in a manner to be described.

Figure 6:
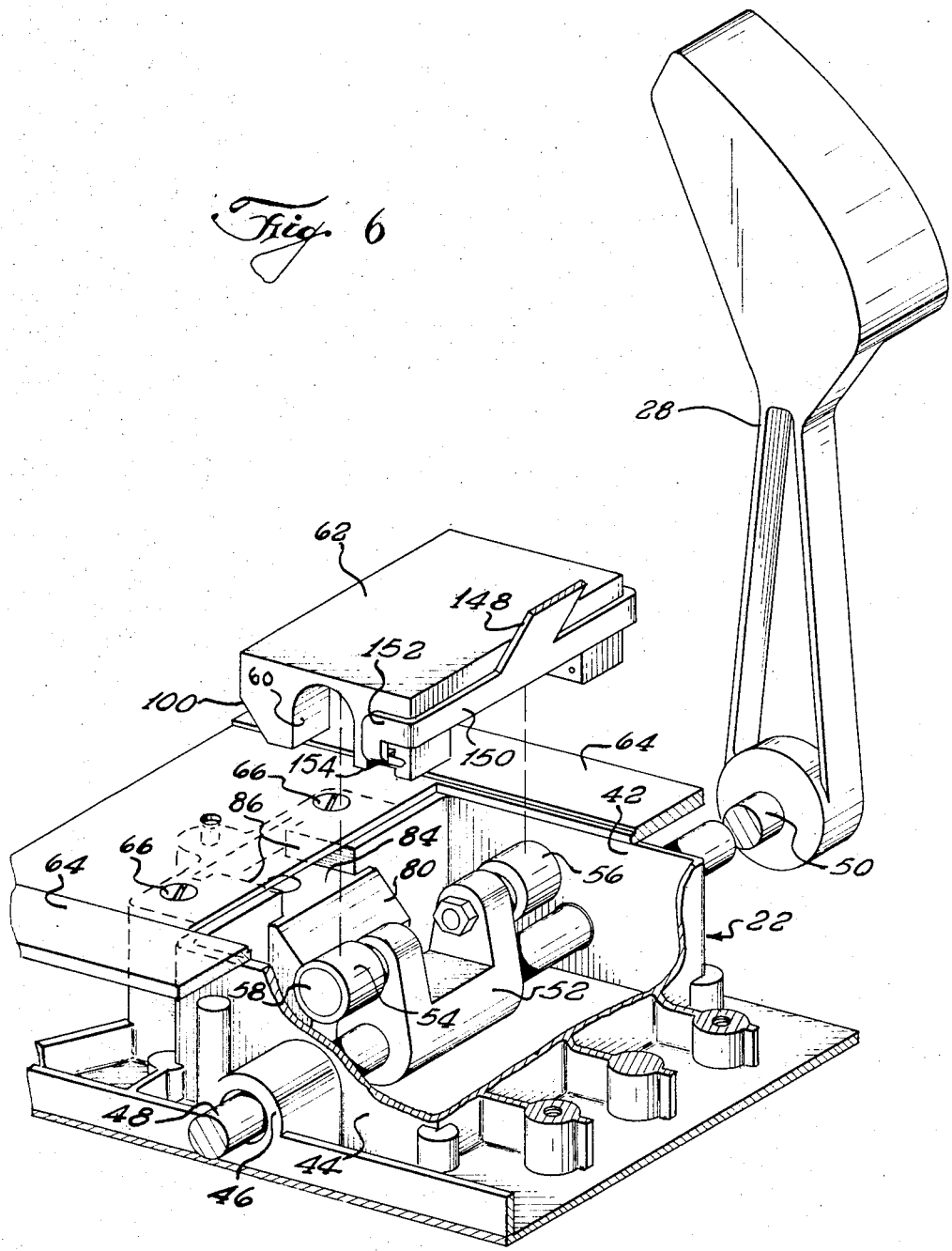
FIGURE 6 is a perspective, partially sectioned, depicting the drawer operating mechanism of the invention.

Turning now to a more detailed description of the card reader assembly of the invention and first to the drawer and card handling mechanism, reference may be had again to FIGURE 3 and further to FIGURES 4, 5, and 6. Viewing first FIGURE 6, the drawer operating mechanism for operating drawer 30 is shown in an interim position such as the position wherein the drawer is partially opened shown in FIGURE 4. As can be seen, the arm 28 is positioned upwardly as compared to the position shown in FIGURE 1 with the drawer 30 closed. The driving mechanism is of relatively heavy construction and includes a relatively simple operation. For this reason, it is the most reliable part of the card reader unit 10 and the least likely to require replacement, repair or adjustment. For this reason, it has been found preferable to locate such mechanism in the lower section or base 22, of the unit, which is relatively inaccessible as compared to the upper section wherein the parts most frequently replaced or changed are secured for accessibility. As can be seen from FIGURE 6, the base 22 is essentially a casting designed to minimize the total weight of the unit and at the same time offer substantial rigidity for the support of the moving parts of the unit. The lower section or base 22 includes sidewalls 42 and 44, each having a bearing, exteriorly positioned thereof such as the bearing 46 shown with respect to wall 44. Through the bearings which are in axial alignment there is a shaft 48, supported for rotary movement and locked by suitable means, not shown, against axial movement. Shaft 48 is fixed to the lower portion of arm 28, as indicated at 50, such that arcuate arm movement effects a direct rotary shaft movement.

Locked to shaft 48 between walls 42 and 44, is a bifurcated member 52, which serves as a cam support for each of two cams 54 and 56, as shown. Each of the cams 54 and 56 are mounted such that the cylindrical surfaces thereof may slide around an axle such as 58 supporting cam 54, to minimize concentration of wear points. Each of the cams 54 and 56 is adapted to engage corresponding surfaces such as 60 formed by a slot in a cam follower 62, adapted to be driven by the cams to, in turn, drive the unit drawer 30 and operate the card ejecting mechanism. The cam follower 62 shown in FIGURE 6, is lifted upwardly for the sake of clarity and its actual working position is as shown in FIGURES 3, 4 and 5. As can be seen from these figures, the surfaces such as 60 are formed by a transverse vertical slot in follower 62, permitting the arcuate movement of cams 54 and 56, to be transformed into a linear relatively horizontal movement of cam follower 62. Moreover, within the arcuate movement transcribed by 54 and 56, the follower is capable of being driven a distance further than that necessary to move the drawer 30 from the fully closed, to the fully opened position with the cams still fully engaged within the surfaces.

Also a part of the lower section is a bed plate for drawer 30 shown as numeral 64, which as can be seen, extends on both sides of the wall 42 and 44 transverse thereto. As can be seen from FIGURES 3, 4 and 5, bed plate 64 is fixedly secured against movement to base 22, as by screws such as 66, shown in FIGURE 6, set down under the upper surface thereof. Additionally, as shown in FIGURES 3, 4 and 5, guide pins such as 68 and 70, located in the forward and rear portions of the bed plate and passing into the apertures in the lower section frame of base 22 are included to assist in assembly alignment.

As can be further seen from FIGURES 3, 4 and 5, the cam follower 62 is fixedly secured to drawer 30, through a drawer base plate 72, such that the drawer through 72 follows exactly the movements of follower 62, under driver of cams 54 and 56. The base plate 72 extends transverse to unit 10 to rest and ride upon the upper surfaces of base plate 64.

As above mentioned, the possible travel of the follower and drawer is not controlled with respect to limits by the driving mechanism including arm 28, shaft 48 and the cam surfaces 54 and 56. It could of course, be so controlled by simple stop members engaging some part of the power train, but the preference of the invention contemplates the provision of a means to limit drawer travel which is adjustable to alleviate manufacturing tolerance problems and to provide a wear adjustment. Turning again to FIGURE 6, it will be observed that mounted rearwardly of the camming mechanism is a surface 80, angularly disposed with respect to the base of unit 10. Surface 80 is formed from an adjustable travel limit assembly 82, supported for vertical sliding movement by a rearward projection 84, fitted within a slot 86, defined by walls integral with the mounting portions of base 22. Through this engagement, 82 is blocked from being driven backwardly. As can be better visualized from FIGURES 3-5, the interior of 82 is relieved as at 88 and suppored vertically by an adjustment screw 90, having threading engaging an integral horizontal flange portion 92 of base 22. A locking nut 94 is provided to lock 90 against accidental movement. The upper face of 90 thus defines the downward movement of 82 and therethrough the relative position of face 80. Member 82 is supported against vertical movement upwardly by a compression spring 96, seated at its upper end against the lower surface of bed plate 64 and at its lower surface within an aperture 98 in the upper portion of 82. The follower 62 includes an angular surface 100, as shown in FIGURES 3-6, disposed on the underside thereof and positioned to engage surface 80 as the follower is driven rearwardly of unit 10. Thus, the member 82 through surface 80 engaging surface 100 operates to limit rearward movement of follower 62 and thereby rearward movement of drawer 30. As shown in FIGURE 4, by the dotted lines, vertical movement of 82 upwardly or downwardly will operate to change the rearward limit of travel of 62. This feature permits less critical tolerances in the manufactured parts with an incident savings in cost, and less trouble in assembly of the manufactured parts, since through 82 the exact rearward travel can be defined merely by an adjustment, and in the field adjustment to compensate for wear of the various operating surfaces. This would of course, include the surfaces 80, the surfaces of the cams and the surfaces of the follower, such as 60 and to a certain extent the upper surfaces of 62 and of the lower bearing surfaces of the drawer.

The forward travel of drawer 30 is limited by a fixed vertical surface 102, which is part of the lower section support casting. The use of a fixed surface to limit drawer travel in one direction need not operate to reduce the advantages immediately above described, since by an appropriate choice of relative dimensions, all possible play due to production, assembly or wear, can nevertheless be taken up by the adjustment of the travel limit as shown.

Figure 7:
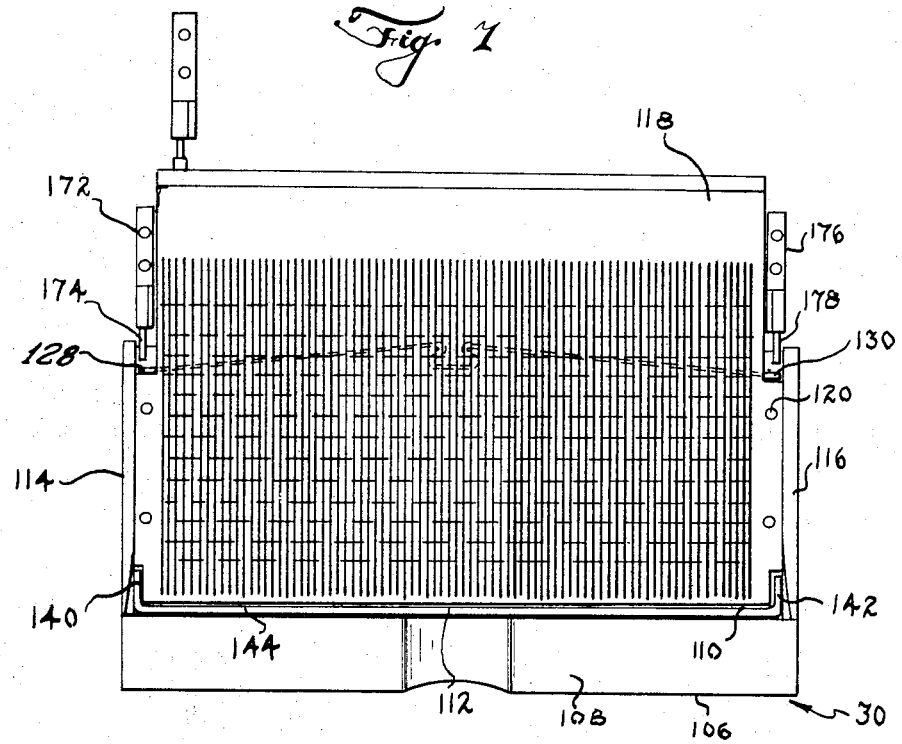
FIGURE 7 is a plan view of the conductive path board member and card reading drawer of the invention.
Figure 8:
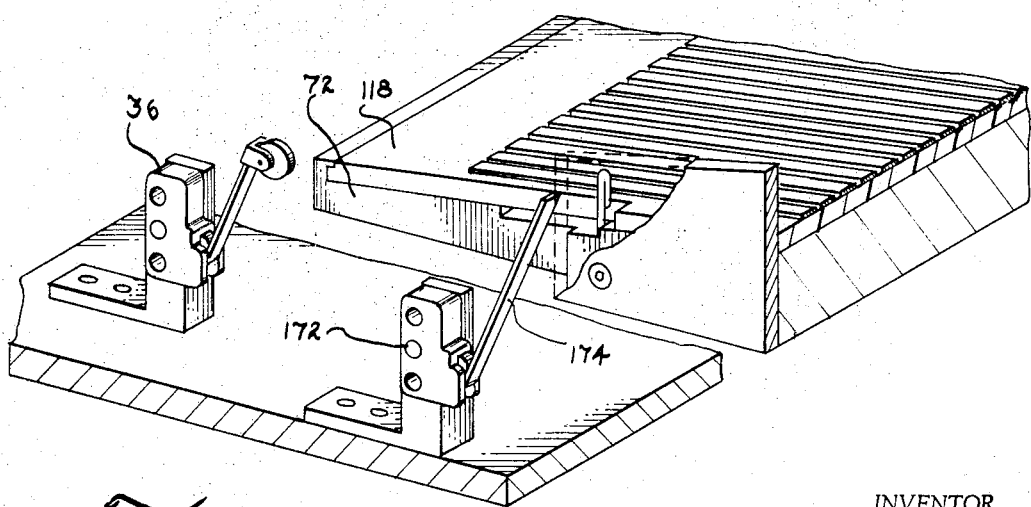
FIGURE 8 is a partial perspective of the card reading drawer conductive path board member in conjunction with means to assure proper operation of the reader.
Figure 15:
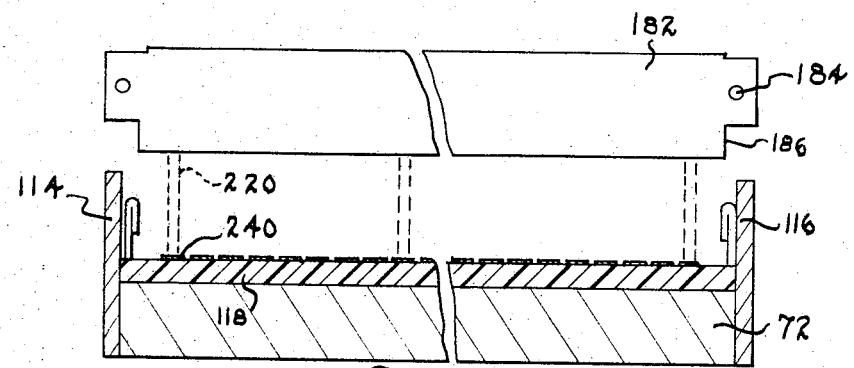
FIGURE 15 is a partial end section depicting the conductive path board and drawer.

Continuing on with the mechanical aspects of the invention, the card handling, ejecting and error preventative features, will now be described. As should now be apparent the drawer 30 is capable of being opened and closed between finite positions relative to base 22 and of course, relative to the upper section including the contact spring members. Drawer 30 includes an exterior frame comprising members 114 and 116 secured to base plate 72 as shown in FIGURES 7 and 15, supporting a drawer handle 106 of the general configuration shown in FIGURES 2 and 3, to define an upper surface 108 extending across the width of the unit 10 and having a substantial depth transverse thereto. Handle 106 is spaced from 72 along its width to define a slot 110 through which a card ejector may operate. This is better shown in FIGURE 7, which depicts the slot 110 with the ejector mechanism therein. As will be apparent from FIGURE 3, the drawer 30 further includes a conductive path board 118, extending across the upper surface of base 72 and fixedly secured thereto through screws, rivets or the like, indicated as 120 in FIGURE 7. Relative sliding movement of 118 to the drawer is further precluded by a rear flange 122 formed of 72, which extends upwardly and over a relieved edge of 118. This is best shown in FIGURES 3 and 8. Beneath 118 and the upper surface of 72, is a slot 124 of substantial length, which serves to house a spring member 126 having end portions extending vertically upwardly above the upper surface of 118. The end portions are shown in FIGURE 7 as 128 and 130, the end 128 being visible in FIGURE 8 and to an extent in FIGURES 3-5. The spring 126 has a configuration as shown in FIGURE 7 tending to force arms 128 and 130 forwardly in slot 124. Spring 126 and the ends thereof operate as part of the ejecting mechanism.

The ejecting mechanism further includes an assembly better shown in FIGURES 3-5 and, in part, in FIGURES 6 and 7. Viewing first FIGURE 3, an ejector member 112 includes a Z-shaped cross-section defining an upper arm 144, a middle arm 146 and a lower arm 148. As can be seen from FIGURE 7, the upper arm 144 extends across the width of the drawer in slot 110 and as shown in FIGURE 5, includes members 142 extending rearwardly from the ends thereof. The lower arm 148 referencing FIGURE 6 has a connection to cam follower 62 via arms such as 150 extending thereabout to position flanges 152 folded into follower slots such as 154. Member 112 is supported for pivotal movement about this point of contact with 62. Further included as part of the mecahnism is a spring drive comprised of a number of balls such as 160 each driven outwardly of a recess such as 162 by a compression spring 164.

The operation of the above described components to achieve card handling, ejection and certain drawer movement control will now be treated. In FIGURE 5 the dotted line representations depict the position of drawer 30, follower 62 and member 112 moved inwardly. This is the normal open position assumed by unit 10, following the ejection of a card and release of arm 28. Drawer 30 and member 112 assume this position due to an automatic and very slight return inwardly following release of the arm 28. As can be seen from FIGURE 5, from the solid lines, with the drawer fully open against the stop limit defined by surface 102, the ball 160 is forced inwardly within ball recess 162 to compress spring 164. Spring 164 operates then to push cam follower 62 rearwardly and as can be seen, such is against only frictional forces. The drawer 30 is thus driven rearwardly a slight amount sufficient to dissipate the stored energy of spring 164. As this occurs, member 112 will pivot downwardly to drop the members 112, 140 and 142 to the position shown by the dotted line.

Considering the drawer to be positioned and arranged as immediately above described, a card of the configuration shown in FIGURE 2 is then inserted with the leading edge slipped into the slot defined by the open drawer. Proper seating of the card is best accomplished by guiding the trailing edge with the fingers until such edge is fitted over the face 164 defined by the inner vertical surface of handle 106. The insertion of the card is against the light spring pressure caused as the spring arms 128 and 130 are driven rearwardly in a motion defined by the slot 124. This position is clearly shown in FIGURE 3. The spring arms position 128 and 130 react against the card to hold it against face 164 and thereafter until the drawer has been closed and then opened. This position with the card inserted, but the drawer open, is useful in situations wherein it is desirable to delay the actual card reading step with the unit 10 nevertheless completely prepared to perform such step.

With the card and drawer in the position as above described, arm 28 is then operated to drive the drawer and card in a motion of closure inwardly and upwardly. The inward motion is apparent from FIGURES 3–5 being the horizontal vector of the total movement of the card. The upward vector is accomplished by reason of having the plane of the card secured on the surface of 118 disposed at an angle to the horizontal movement. It should be apparent that by an appropriate choice of this angle engagement of the upper contact springs is avoided when the card is first inserted, and thereafter as the drawer is closed it is reduced to only that engagement necessary to perform the actual reading of the card. This will be more completely described hereinafter with respect to FIGURES 11–14.

Continuing further and considering that the card is properly inserted within the drawer, closure to the position in FIGURE 3 will effect a reading of the card. An incomplete closure will of course, not operate switch 36 and therefore not supply an input voltage to the unit. The operator will, in such event, be apprised of the advisability of assuring that arm 28 is in its full forward and downward position.

Considering now that the card is erroneously inserted, with the broken corner leading rather than trailing, drawer closure will fail to produce an output to apprise the operator of an erroneous insertion of the card. This occurs because if the card is erroneously inserted with the broken corner leading, one of the spring arms 128 or 130 will not be driven fully rearwardly. This is because the surface tending to drive such spring is not the rear leading edge of the card, but rather the broken edge. As can be seen from FIGURES 7 and 8, the springs such as 128 shown are so positioned as to have a path of travel responsive to drawer closure in line with arms 174 and 178 of further normally open switches 172 and 176, respectively. Switches 172 and 176 are secured by a bracket to the base of the lower section 122 as shown in FIGURE 8. If a card is improperly inserted then, one of the spring arms 128 or 130 will not be rearwardly positioned to an extent to engage the respective switch arm and thus the switch will not be operated to closure. The input from 12 to the card reader is fed in series to the three switches 36, 172 and 176, such that the failure of any one of them to be closed will preclude any output and thereby apprise the operator of malfunction. Of course, as a card is properly inserted, both sliding arms 128, 130 will be rearwardly positioned to engage the arms 174 and 178 as the drawer is driven to its limit of rearward travel. It is contemplated that additional means may be incorporated within unit 10 to more accurately identify operating errors. For example, two differently positioned or differently colored lamps secured to the exterior surface of unit 10, such as at the top, rearward of cover 26, could be driven to signal either of the two conditions above described by the simple addition of extra contact points or leads to the switches from the signal lamps.

The above should adequately provide an understanding of the mechanical aspects of the invention operable to facilitate card insertion and to preclude erroneous use of the unit. After a card has been read, arm 28 is pulled in an upward and outward arc to drive the drawer 30 to the open position. As this occurs, the ejecting mechanism above mentioned operates generally as follows. First, as the arm 28 is rotated to drive the drawer 30 outwardly as above described, the contact springs operate as to be hereafter described to hold the card fast, thus further loading spring 126 through arms 128 and 130. The card then backs off of the face 164 and as the drawer moves out and down, the card pops off of the contact springs and outwardly against face 164 once again. At that point 112 is driven upwardly driving the face of the card off of the surface 164 holding the card within the drawer. As the forward surface of the card clears surface 164, the spring member 126 still being loaded and against the card through its arms 128 and 130, drives the card outwardly. At this position the drawer 30 and of course the card, has been dropped so that the card is then free of contact with the upper spring members and the spring action of 126, even though light, is quite adequate to accomplish a full ejection of the card.

Turning now to a final mechanical or electromechanical aspect of the card reader of the invention, reference is made to FIGURES 9–15. In FIGURE 9 there is depicted the contact spring assembly 180, positioned in upper section 24 and accessible by lifting cover 26 of unit 10. Assembly 180 is comprised of a plurality of machined or molded insulating blocks 182, stacked and held by end positioned bolts or rivets such as 184. As can be seen from FIGURE 15, the blocks 182 are cut out at their ends as at 186 to define slots extending along the length of the assembly shown as 186 to provide clearance for members 114 and 116. By extending the springs and insulating blocks below the top edge of members 114 and 116, cards are prevented from being inserted improperly with the drawer open. The assembly 180 is held within the upper section in the manner shown in FIGURE 3, which includes an engagement with a forward wall 188 through a block 190 fitted over the end plate 182 and apertured to receive the fastening bolt or rivet end 184. Driving 180 against face 188 is a further member 192 extending across the rear and outer block 182 under the pressure of a number of adjustment screws such as assembly 194 threaded through and supported by a transverse beam 196 of the upper section 24. Assembly 194 includes a locking nut 198 to prevent the assembly from being accidentally loosened and an adjusting bolt to permit the assembly to be threaded inwardly and outwardly to provide an adjustment for block 180. The forward relative travel of assembly 180 is controlled by assembly 194 and the use of different sized members 190 which serve as shims. Because of this feature, manufacturing, assembly and use tolerances can be readily compensated to further provide production and use economies with respect to the invention.

As can be seen from FIGURE 9, each of the blocks 182 includes along its length, vertical slots 204 of a width and depth to accommodate contact spring members fitted therein. In one arrangement of the assembly 180, the depth of the slots 204 is made to be slightly less than the thickness of a spring member such that as the blocks are compressed the springs are gripped by opposite block faces and rigidly held thereby. In an alternative construction a layer of epoxy, cement or the equivalent is placed over the first block 182 to be stacked with the spring members therein and the other blocks and contact springs similarly treated with the assembly then being lightly clamped together. This operates to bond the blocks 182 and spring members into a physically integral unit.

Further features of assembly 180 include, along the bottom thereof, transverse slots 206 sufficient to permit unimpeded movement of the spring members fitted therein. Each block 182 at its upper end includes a central projection 208 adapted to provide isolation and insulation between the rows of spring members of each block. On one side of 208 there is an offset such as 210 to provide a clearance for the upper barrel portion of each spring member and a bevel 212 to eliminate tolerance problems with respect to the fit of a spring member within the associated slot. On the opposite side of 208 is a further offset 214, which combines with the opposing offset 210 to provide further clearance for the upper barrel portions of the spring members. The assembly 180 permits the mounting of a large number of spring members in a reliable and economical manner.

In FIGURE 10 there is shown an enlarged view of a contact spring member 216. The dotted portion shown in FIGURE 10 represents a production carrier strip utilized to propel the metallic sheet material which eventually takes the shape shown in FIGURE 10 through a series of progressive die stages which operate to blank, shear, bend and otherwise form such material into the spring member configuration. The carrier shown as 218 may be removed to leave individual spring members appearing as indicated in FIGURE 9, or may be left intact to serve as a commoning member or bus bar between all of the contact springs 216 of a given row of contact springs. In such case the carrier 218 would be folded as shown in FIGURE 10 to rest on the top of an adjacent block 182, as at 208. The first set of springs would have their carrier 218 rested upon the top of the control block 190 shown in FIGURE 3. The advantages of each of the immediately foregoing features will be made more apparent by the description of the electrical circuit embodiments contemplated by the invention.

Referring again to FIGURE 10, each contact spring 216 will be seen to include a support portion 220 having a length sufficient to permit the spring to be held against relative movement by the operation of blocks 182 and their slots 204. The width and thickness of the support portions 220 are, of course, made to correspond to the fitting engagement with each slot 204. From the upper end of support portion 220, there is provided an integral contact barrel 222, which is split to define a spring action if such is desired and joined to the carrier strip 218 through a portion 224. Extending from the opposite end of support 220 is an angularly disposed arm 226 including at the end thereof a contact surface support 228 formed to reside in a plane substantially parallel to the plane of the board 118 carrying the conductive paths as shown in FIGURE 3. A turned up end 230 is provided to define a face 232 of a length and angular disposition to preclude the spring from being caught and damaged by any portion of a tabulating card. Centered in 228 and extending from the bottom thereof is a contact portion including a rounded contact face shown as 234 which is struck out during the forming of a contact spring 216. Each spring 216 and the carrier strip is preferably of spring grade No. 4 hard brass. Each spring member 220, including its carrier strip, is preferably overplated with a layer of nickel beneath a layer of gold to provide a low resistance electrical path through the member and to prevent corrosion of the surface areas thereof.

Viewing now FIGURES 11–14, the operation of the contact springs will be described. In the figures, a portion of the card board support 18 is included showing a portion of a conductive path 240 thereon and a portion of a card 242 including in FIGURES 12–14, a card hole or slot 244. To better visualize the operation, typical dimensions of a tabulating card may be considered as including a thickness of approximately six thousandths of an inch with the hole or slot 244 being of a rectangular shape fifty by one hundred thousandths of an inch on machine punched cards and seventy-five by one hundred and twenty-five thousandths on cards of the pre-scored type for manual punching. Other standard cards have a circular opening of one hundred thousandths of an inch in diameter. The particular spring arm 226 shown in FIGURE 11, respresents the second from the last trailing spring row of assembly 180; the operation of the other springs being substantially similar except for a first engagement with the card surface rather than the board path 240 due to their position over the surface of an inserted card. The last or trailing row of springs, shown as 250 in FIGURE 3, initially contacts and remains on board path 240 to provide input. As member 118 carrying a card 242 travels inwardly and relatively upward in the motion above described, the face 234 of the spring members of the row of springs 250 comes to rest lightly on the board, the remaining forward rows of springs coming to rest on the surface of the card. Further inward movement as the drawer is closed will deflect the spring member 226 further, such that its surface 234 then rides under pressure on the surface of the card as shown in FIGURE 12. If there is no aperture to be read, the spring will of course, remain deflected but insulated from path 240. If there is an aperture such as 244, further movement will find the loaded spring end 228 and surface 234 driven to snap downwardly as shown in FIGURE 13 to contact surface 240 under spring pressure. The final movement of closure of drawer 30 and thus board 118, will effect a travel as indicated in FIGURE 14 providing a wiping action under constantly increasing spring pressure between surface 234 and the upper surface of the conductive path 240. In a typical unit this wiping action includes a travel of approximately thirty thousandths of an inch. It is preferable therefore, to have the end of the spring including the arm 226 and sections 228 and 232 so dimensioned that the movement of the board and card, after the initial contact shown in FIGURE 13, will not result in the card trailing surface of the hole 244 driving the spring upwardly out of contact or reducing the spring pressure. In an actual unit including a spring arm of a thickness of eight thousandths of an inch, a spring length of three hundred and fifty thousandths of an inch for arm 226 disposed at an angle $A_1$ equal to forty-five degrees as shown in FIGURE 11, the foregoing operation was achieved with a spring pressure of approximately one ounce. As an important point, as the wiping motion occurs due to inward board travel, the board surface of course continues to move upwardly further deflecting spring 216 to increase spring and therefore contact pressure. In an actual unit the drawer travel included a vertical movement of eleven and one half thousandths of an inch per one hundred thousandths of an inch inward movement. Due to this and to prevent unwanted spring set, it is preferred that arm 226 be relatively long as indicated by the above dimension. With the spring members disposed as in FIGURE 14, a conductive path will then be established for each card hole. It is to be noted that during the above operation the card 242 is held from relative movement with respect to the board 118. This is due to its being held against face 164 by spring 126 which operates to preclude even slightly different card placements.

Describing now the mechanical operation of the springs 216, to assist the card ejection mechanism with minimum damage to a card, the end portion 232 of each spring is shaped generally as shown to include an angle $A_2$, which may approximate forty-five degrees to drive the card off the spring and preclude the end of the spring from catching in the card aperture as the card is ejected. As board 118 is withdrawn as drawer 30 is opened, an operation takes place best indicated by following the index points indicated as I in FIGURES 13 and 14. The first movement of withdrawal of 118 to the right occurs with the card 242 sliding over the top thereof such that the now trailing face of hole 244 engages the portion 232 of the spring member as shown in FIGURE 13. Of course, since the board 118 is also moving downwardly as it moves to the right the card will be broken away from the face of 118 as indicated in FIGURE 13 by the dotted line. In essence, the card hangs up temporarily with the apertures 244 held against the spring member portions 232 by reason of the ejector spring 126 through the ends thereof 128 and 130 engaging the rear face of the card along the outside edges thereof. Since the card is held by such engagement, its now leading face, formerly held against face 164 will be relatively withdrawn therefrom and additionally, since there is relative movement between the drawer and the card the spring 126 will be further and additionally loaded. Considering now that the board 118 has been withdrawn slightly and the card 242 lifted and held by the spring members, at some point as the spring 126 is further loaded, the angle of portion 232 through the spring pressure applied by 126 will drive the card off of the spring and forwardly. The arrangement of the structure is such that this forward movement takes place with the card then substantially clear of both the springs and the board surface 118. The card will fly forward to reengage the face 164 and be temporarily stopped. Further travel of the drawer outwardly will, as heretofore described, then operate the member 112 to lift the face of the card off of 164 and cause final card ejection under the remaining load of spring 126. Drawer 30 will then automatically return inwardly slightly to drop 112 and members 140 and 142 to the position shown in phantom in FIGURE 5.

From the above it will be noted that operation of spring 126 and face 164 eliminates any problem of initial card placement and the operation of 112 through the slight return movement of drawer 30 eliminates any problem of final drawer position. These features tend to eliminate both operator skill requirements and vagaries.

Turning now to a final aspect of the invention, the electrical operation to provide read-out will now be described. Referring to FIGURES 7, 8 and 15–19 in conjunction with the brief description above given, the invention contemplates that board member 118 be adapted to be fitted within and on the bed plate 72 and secured thereto by screws in the manner shown in FIGURE 7. The board 118 is of insulating material of the type used for printed circuit cards and includes on its surface a series of parallel conductive strips described as 240 above and which, in the embodiment heretofore discussed, are disposed transverse to the length of the board 118. The strips 240 in such embodiment correspond in number to at least the number of columns on a standard tabulating card, as for example, eighty. The length of the strips is such as to accommodate the maximum number of rows possible on a standard tabulating card, such as for example, twelve, plus at least an additional length for the back row of springs 250 which provide input. The dotted lines shown in FIGURE 7 represent the general disposition of spring members over the conductive strips including twelve rows plus a thirteenth, which serves to provide input.

Referring back to FIGURE 1, the input provided from 12 may be considered as brought into unit 10 through the connector 34 as shown in FIGURE 3 and from there via a single lead to the most rearward row of contact springs shown as 250 in FIGURE 3. The input, of course, passes through the three switches 36, 172 and 176, for the reasons above outlined. Assuming that a tabulating card is properly positioned and that the drawer is properly closed, the lead to the rear row of springs will be supplied with current during the last movement of the drawer, well after the various conductive paths have been established. In the embodiment shown in FIGURE 7, each of the conductive paths 240 is to be energized and therefore each of the spring members 216 of row 250 is commoned to the input lead. This is preferably accomplished by leaving the carrier strip 218 attached to the spring members of row 250 in the manner above described. With the rear row of springs then energized and the drawer closed, all of the conductive strips 240 will also be energized. At points wherein there are holes within a tabulating card to define the intelligence content thereof, spring members will, of course, be extended therethrough to contact the strips 240 and produce outputs to the individual spring arms identical to the pattern of holes in the card.

If it is desired to read the particular output from all spring members simultaneously, then separate leads are provided to each of the contact springs other than the row of input springs. These leads may be secured to the upper portions 222 of the spring members by any suitable means including soldering. It is preferred, however, to use a connector terminal adapted to engage the spring member such that output leads may be variously and readily changed. In FIGURE 9, for example, there is shown an output lead 252 including a split pin terminal 254 crimped or otherwise fastened to the lead as at 256. With leads such as 252 interconnected to each spring member other than input row 250, separate and distinct outputs will be provided from each spring assembly engaged in a tabulating card hole with no output provided on the spring members held away from the input on 240. The above represents a typical card reading application and circuit arrangement.

It is contemplated, based upon aspects developed through field experience, that this same card reader unit can be utilized with other alternative circuits. For example, in the above embodiment the last or input row of spring members was disclosed as being commoned to a single input. It is contemplated that separate inputs for each spring member of the input row may be provided through individual input leads. In this case external scanning equipment such as the stepping switch scanner 16 may then be utilized to provide phased pulses of input current rather than a direct common input from 12. With 16 in operation each one of the input leads, as for example each one of eighty leads in column groups of twelve, can be sequentially energized with the other columns of leads not energized during any one step. This allows sharing of external equipment permitting, in essence, the same utility device to be repeatedly used to indicate the content of each column of spring members with respect to one column at a time. In conjunction with this alternative input embodiment of the circuit, it is the usual practice to provide separate column inputs and to additionally provide rows of commoned spring members. In this case each one of the rows, other than the input row 250, is left attached to a carrier 218 to thus common all of the springs of a row. In this use, the inclusion of a stepping switch to provide sequential inputs to the columns of springs permits the use of only a number of output leads sufficient for the total number of rows other than the input row. As a quick comparison with the approach above given with individual leads for each spring contact, the initial total of one input lead and nine hundred and sixty output leads compares with the latter embodiment of eighty input leads and twelve output leads for a total of ninety-two leads. This, of course, requires the addition of peripheral equipment.

Further in conjunction with the latter circuit embodiment and including a considerable advantage of its own, the unit 10 of the invention includes a clearance above the contact spring 180 to permit the use of a diode block shown in part in FIGURE 9 and numbered as 260. In a preferred arrangement the block 260 is of insulating material and includes embedded therein, a series of diodes each having its conductors extending to engage on one side a pin member such as 254 and on the other side an output lead such as 252 which may be crimped or otherwise fastened thereto directly or through a terminal not shown. In use, the diode blocks 260 include two, twelve, or as many as eighty diodes with the blocks being of a configuration to be fitted directly onto rows of spring members with the terminal members thereof inserted to contact spring barrels such as 222. For practical reasons to avoid tolerance problems, the blocks may be kept in length to smaller numbers of diodes and terminal pin members. Additionally, since the blocks are readily detachable, by keeping the numbers of diodes per block low, diode replacement due to failure may be accomplished without having to remove all of the blocks or diodes of a given row.

Figure 16:
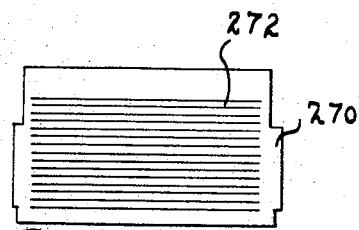
FIGURES 16–19 are schematic plan views of alternative arangements of conductive path boards.
Figure 17:
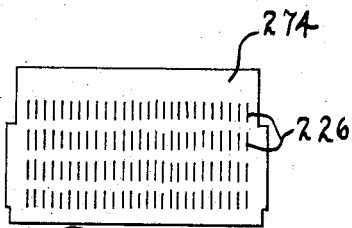

In conjunction with the foregoing description of the electrical circuit contemplated by the invention, other circuit embodiments are contemplated, including those shown in FIGURES 16–19. As can be seen therefrom, the insulating mounting boards shown are substantially identical in shape to 118, such as to be fitted within unit 10 in lieu of 118 in the manner depicted in FIGURE 7. The single difference between the embodiments shown in FIGURES 16–19 lies in the disposition of the conductive paths disposed thereon. In FIGURE 16 the board 270 includes conductive paths 272 which are disposed in lines along the width of the board. With a board of this type an input to any spring of a row of springs would also be present upon any other spring in engagement with the conductive path under such row; which feature contrasts with the column-by-column energization shown in the embodiment above described with respect to board 118. The other adaptations of input-output arrangements above mentioned can, of course, be utilized with the board shown in FIGURE 16 modified to accommodate the row distribution of the conductive paths 272. In FIGURE 17 a board 274 is shown having conductive paths 276 thereon similar to the conductive paths of board 118, but broken to define patterns of conductive paths such as the four separate rows shown. With this arrangement four separate rows of springs may be utilized to input to the conductive paths and a further row or rows utilized to develop outputs associated therewith. The remaining rows are then isolated from the particular input to a given group of rows.

Figure 18:
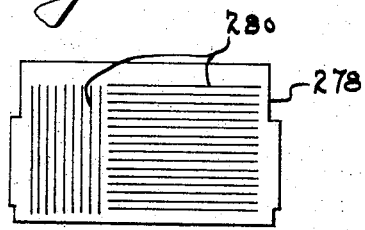
Figure 19:
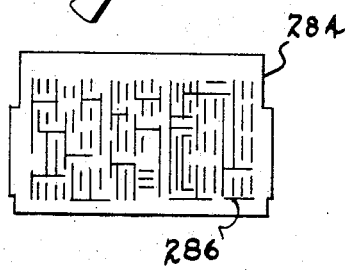

FIGURE 18 shows a board 278 having conductive paths 280 grouped with part of the paths running transverse to the board width and part of the paths running along the board width. FIGURE 19 shows yet a further board construction 284, wherein a pattern of intersecting and connected conductive paths 286 is established on the board for performing more complex functions.

The boards above described extend the uses of unit 10 from the usual applications of card readers to more direct operations. For example, the unit may be used to program computers, office equipment or even in industrial uses wherein different equipments must be interconnected for different production cycles such as in cracking plants and assembly lines. The particular advantage of the card reader of the invention, with respect to the different boards above described, is that with very little effort the board can be changed to extend the utility of the card reader to numerous and frequently diverse circuits. The provision of leads which may be readily changed either directly at the contact springs or by changing the positions on the connector 32, permits the card reader of the invention to be rapidly converted with respect to changes in peripheral equipment to accomplish different stepping functions and incident output sequences.

In short summary, the advantages of the invention include the provision of a structure which is readily producible, which is adjustable for ease of assembly and use, and which is durable with respect to use in a wide variety of physical locations and environments ranging from office or factory, to aircraft or ship. Certain of the features, including for example, the spring wiping action which provides substantial spring pressures permit the unit to have a wide utility by assuring reliable operation even in the presence of vibration or inertial shock. Features are included which permit circuit changes to be made within the unit by changing the pattern of lead connections either at the contact springs or at the unit connector. Additionally, the basic circuit can be changed by a change of conductive path insulating boards. The particular mode of card handling and contact spring engagement in conjunction with the safety features for assuring proper card and drawer insertion and withdrawal permits rapid manual card reading with minimum damage to cards.

These and other advantages should by now be apparent to those skilled in the art, but the full scope of the invention including all reasonable equivalents for the various components thereof should only be taken to be defined by the following claims in which:

I claim:
1. An improved card reader including a housing having an opening therein and a base including portions defining a drawer bearing surface extending horizontally from said opening, a movable drawer mounted in said opening for sliding movement along said bearing surface inward and outward relative to said housing in a horizontal sense, the said drawer having an upper surface carrying conductive paths disposed at a slight angle relative to the horizontal plane of movement of said drawer on said bearing surface, the said drawer including means to receive and secure a tabulating card on said upper surface, a drawer transport mechanism operable to carry said drawer inwardly and outwardly relative to said housing to facilitate the insertion of a card on the upper surface thereof preparatory to card reading and facilitate removal of a card from the upper surface thereof following reading, a bank of contact spring members secured within said housing with the ends thereof defining contact surfaces and disposed in a common plane parallel to the plane of the upper surface of said drawer and disposed in the path of drawer travel with contact surfaces extending to engage a card and the upper surface of the drawer as the drawer is driven within said housing with the relative disposition of said contact surfaces and the upper surface of said drawer causing a wiping engagement under increasing wedging pressure between said contact surfaces and the upper surface of said drawer carrying said conductive paths to complete circuit paths through card holes.

2. The card reader of claim 1, wherein the drawer includes a tabulating card ejector mechanism operable to effect card ejection after the drawer is substantially displaced outwardly to an open position.

3. The card reader of claim 2 wherein the ejector mechanism includes a portion adapted to engage means on the transport mechanism to return the drawer inward slightly after the drawer is fully opened to displace said ejector mechanism from the path of travel and permit insertion of a card.

4. An improved card reader comprising a slidable drawer including conductive paths thereon adapted to transport a card into and out of a position for card reading, a plurality of contact spring members secured in said reader having arms extending to define contact surfaces adapted to engage a card transported on said drawer, the said drawer having a surface travel angularly disposed to the normal relaxed position of said spring members such that the contact surfaces thereof make contact through card holes with the conductive paths on the drawer and wipe thereover under increasing spring pressure.

5. The card reader of claim 4, wherein each contact spring member is comprised of a body portion secured within an insulating block and having at one end an arm angularly disposed to the plane of drawer travel carrying a contact surface and at the other end thereof means to receive a terminal connected to a conductive lead.

6. The card reader of claim 4, wherein the said spring members are in rows and columns and the spring members of a given row are commoned to each other through an integral strip.

7. The card reader of claim 4, wherein the said spring members are in rows and columns and the spring members of one row are connected to an input lead.

8. The card reader of claim 4, wherein the said spring members are in rows and columns with an input lead individual to each spring of one row.

9. An improved card reader having a drawer adapted to be opened and closed to accomplish card reading including a card ejecting mechanism comprising a member adapted to be spring loaded upon the insertion of a card and first means to hold said card as drawer closure is accomplished, second means to temporarily hold a card from being ejected as the drawer is opened which operates to further load said member, and third means to then disengage said card from said first means to permit said member to finally eject said card.

10. The card reader of claim 9, wherein the said member is a spring having arms extending to engage a card at spaced points along the card edge as inserted within the reader.

11. The card reader of claim 9 wherein the said first means is a transverse surface positioned on the drawer.

12. The card reader of claim 9, wherein the said second means includes contact spring arms extending downwardly over said drawer.

13. The card reader of claim 12, wherein the said arms are interconnected to conductive output leads.

14. The card reader of claim 9, wherein the said third means includes spring means driving an arm having surfaces proximate the surface of the drawer to drive the card upwardly and at the same time drive the drawer inwardly.

15. An electrical switch of the type utilized to make or break multiple circuit paths the combination including a bank of contact spring members connected to electrical leads to provide input and output circuit paths, said bank of contact spring members including an insulating block with portions of said members affixed in said block and a portion of each member extending out of said block along an axis disposed at an angle relative to a lower surface of said block with the ends of said contact members defining contact surfaces disposed substantially in a common plane, a flat insulating member having conductive strips thereon, means angularly inclined supporting said insulating member with the upper surface thereof having said conductive strips thereon parallel to the plane of said contact surfaces and further means for driving said inclined means so that the conductive strips are caused to engage said contact surfaces and wipe the contact surfaces under an increasing wedging pressure.

References Cited

UNITED STATES PATENTS

| | | | |
|---|---|---|---|
| 2,594,748 | 4/1952 | Earl | 200—16 X |
| 3,148,251 | 9/1964 | Burke | 200—46 |
| 3,152,247 | 10/1964 | Brown | 200—46 X |
| 3,223,956 | 12/1965 | Dufendach et al. | 200—16 |
| 2,830,759 | 4/1958 | Hudes et al. | 235—61.11 |
| 3,042,299 | 7/1962 | Sherman | 235—61.11 |
| 3,066,863 | 12/1962 | Wilson | 235—61.11 |
| 3,156,793 | 11/1964 | Rosen et al. | 200—46 |
| 3,315,044 | 4/1967 | Newsome et al. | 200—46 |

FOREIGN PATENTS 1,300,255  6/1962  France.

BERNARD A. GILHEANY, *Primary Examiner.*

H. E. SPRINGBORN, *Assistant Examiner.*